(No Model.) 6 Sheets—Sheet 1.
L. L. CULVER.
WATER HEATER.
No. 470,989. Patented Mar. 15, 1892.
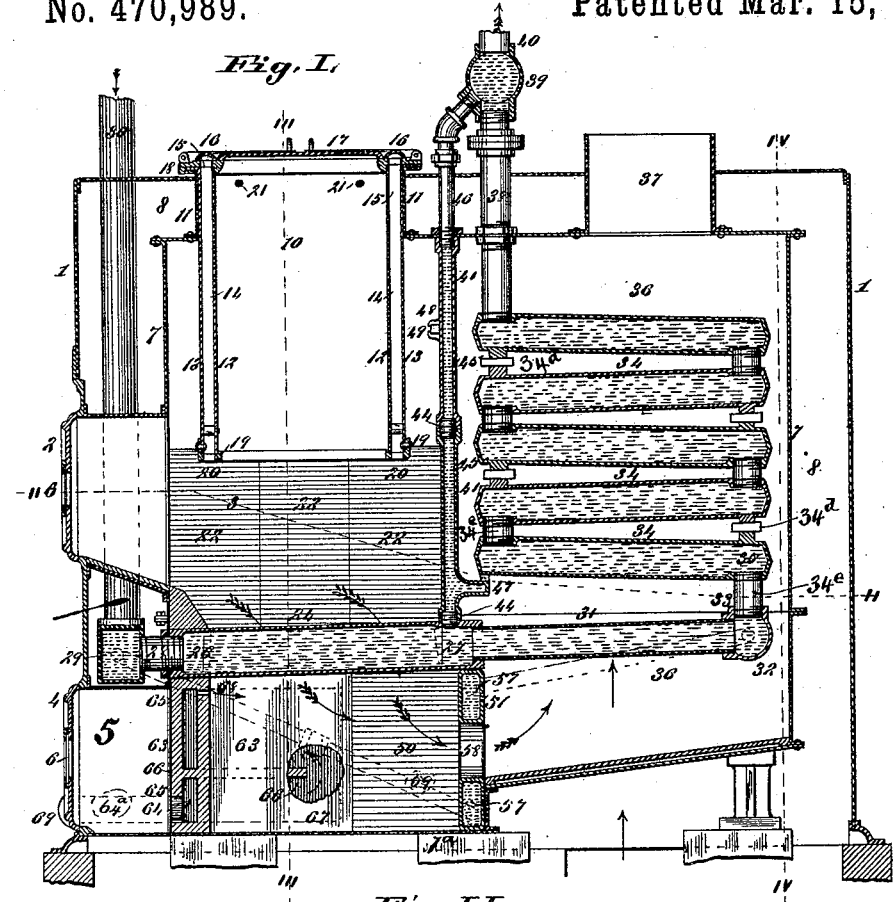
Attest:
E. Arthur
S. H. Knight
Inventor:
Lucius L. Culver
By Knight Bro.
Attys.

(No Model.) 6 Sheets—Sheet 2.
L. L. CULVER.
WATER HEATER.
No. 470,989. Patented Mar. 15, 1892.
Fig. III.
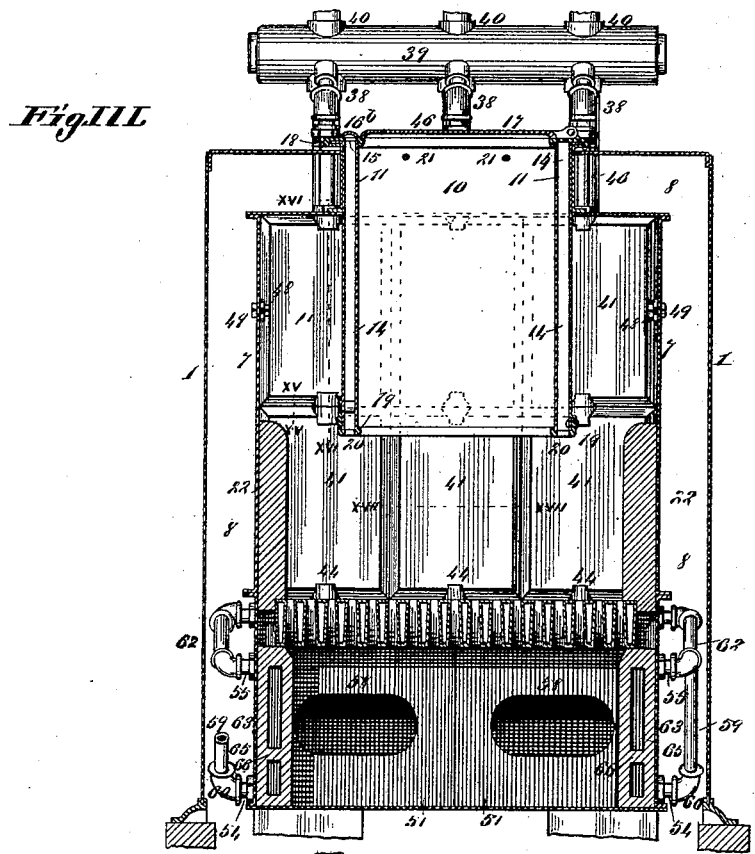
Fig. IV.
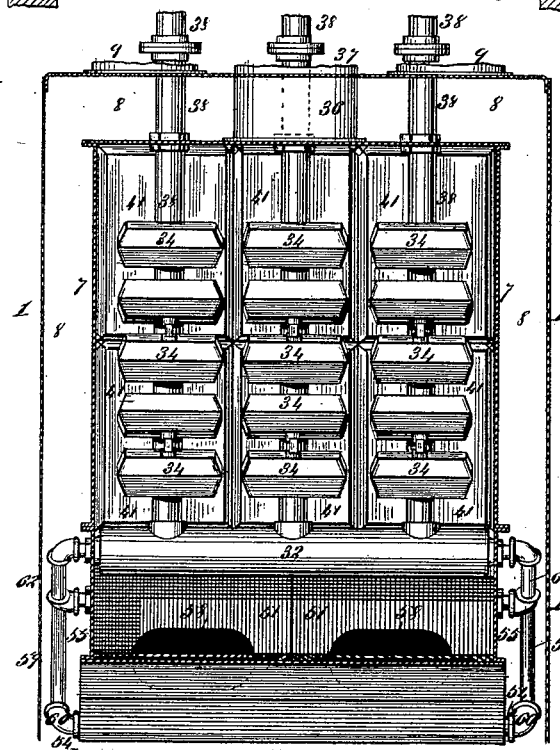
Attest:
E. Arthur
S. H. Knight
Inventor:
Lucius L. Culver.
By Knight Bro.
Atty.

(No Model.) 6 Sheets—Sheet 3.
L. L. CULVER.
WATER HEATER.
No. 470,989. Patented Mar. 15, 1892.
Fig. V.
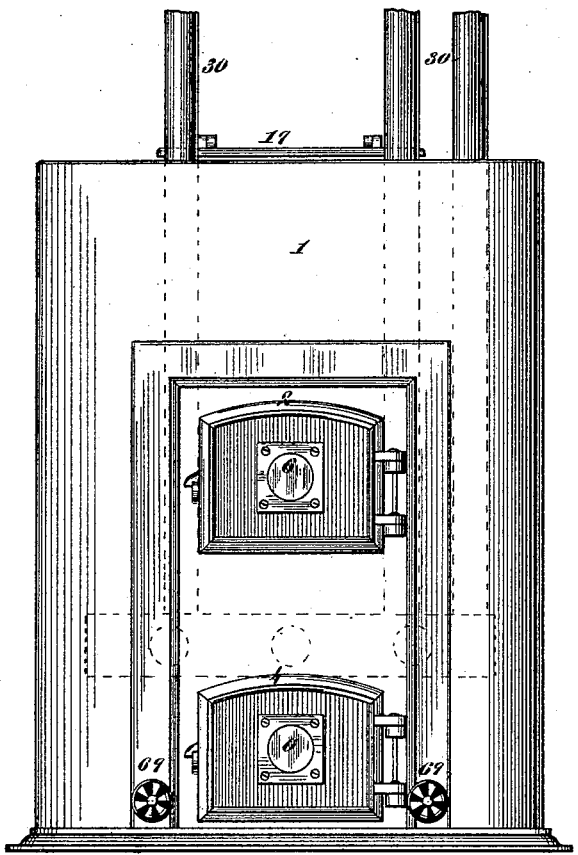
Fig. VI.
Fig. VII.
Fig. VIII.
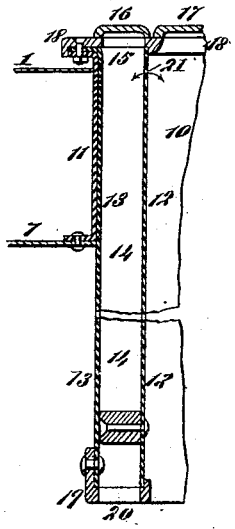
Attest:
E. Arthur
S. H. Knight
Inventor:
Lucius L. Culver.
By Knight Bro.
Attys.
THE NORRIS PETERS CO., PHOTO-LITHO., WASHINGTON, D. C.

(No Model.) 6 Sheets—Sheet 4.
L. L. CULVER.
WATER HEATER.
No. 470,989. Patented Mar. 15, 1892.
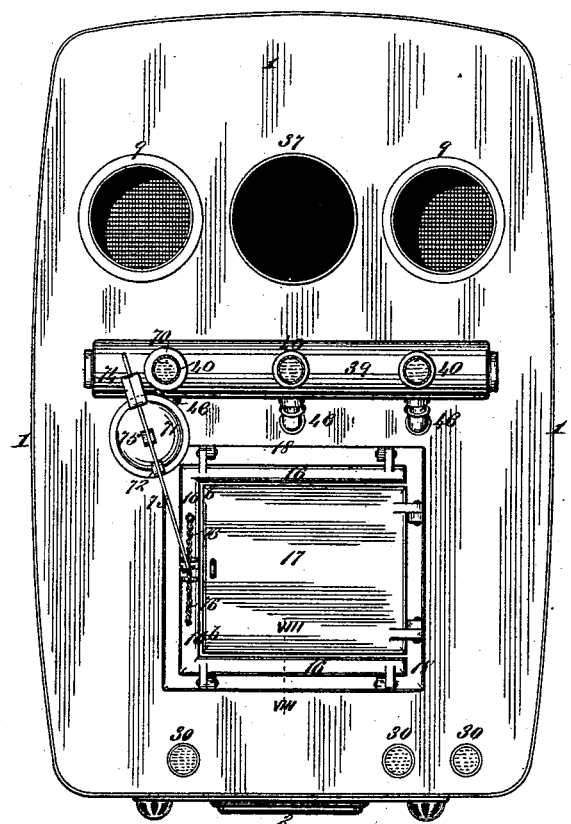
Fig. IX.
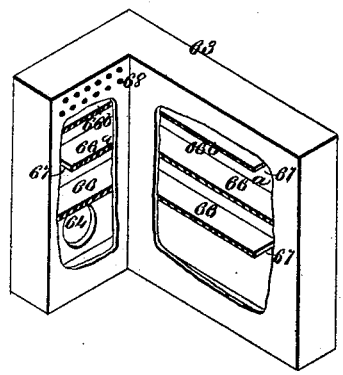
Fig. XI<sup>a</sup>
Fig. X
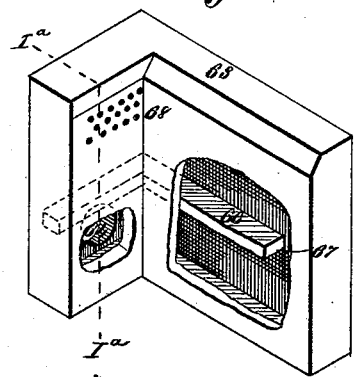
Fig. XI.
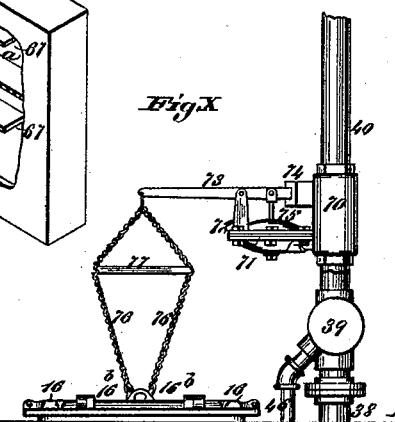
Attest:
E. Arthur
S. H. Knight
Inventor:
Lucius L. Culver.
By Knight & Bro.
Attys.

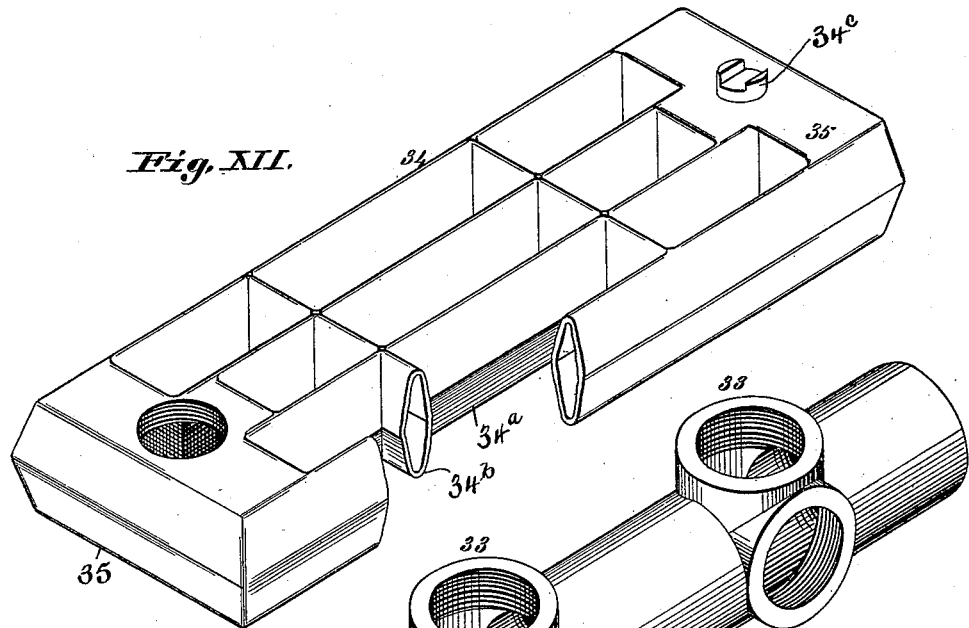

(No Model.) 6 Sheets—Sheet 6.
L. L. CULVER.
WATER HEATER.
No. 470,989. Patented Mar. 15, 1892.
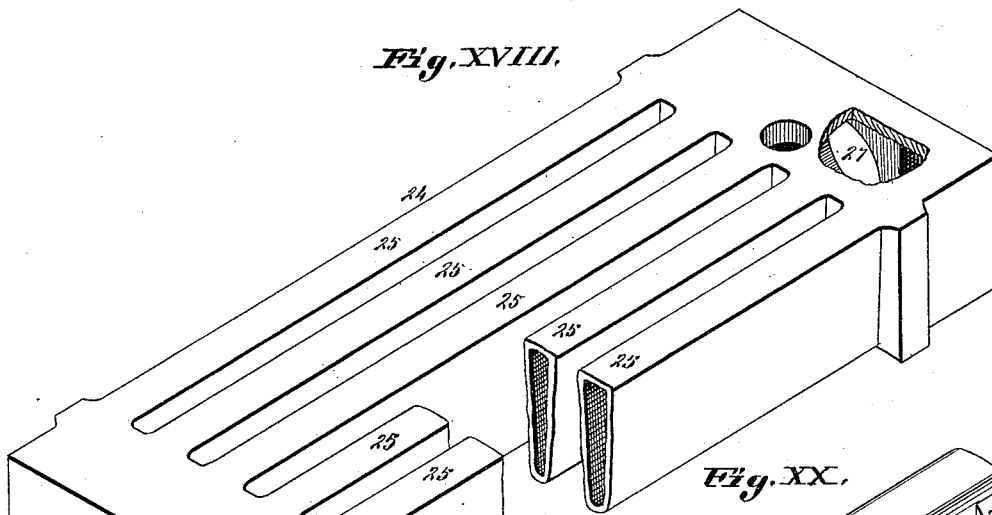
Fig. XVIII.
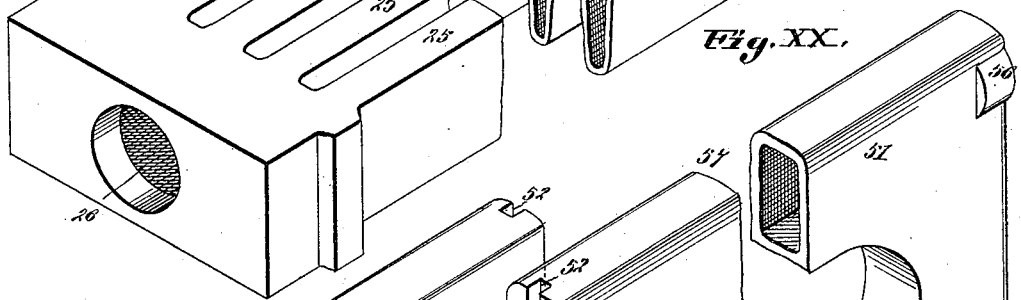
Fig. XX.
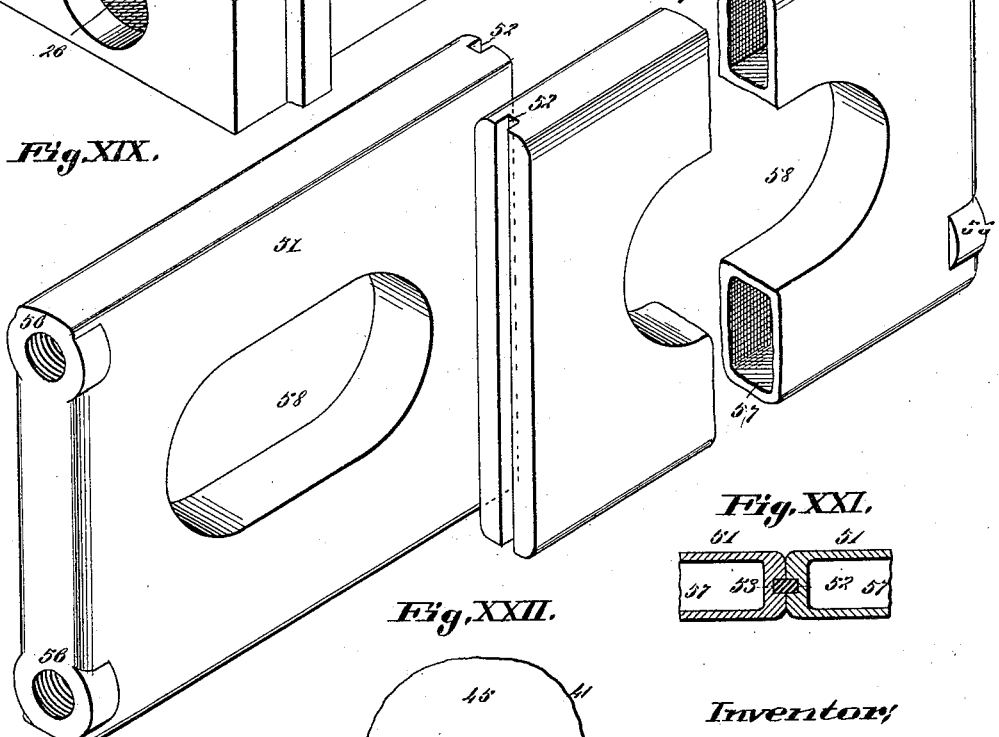
Fig. XIX.
Fig. XXI.
Fig. XXII.
Attest:
E. Arthur
S. H. Knight
Inventor,
Lucius L. Culver.
By Knight Bro.
Atty.
THE NORRIS PETERS CO., PHOTO-LITHO., WASHINGTON, D. C.

UNITED STATES PATENT OFFICE.

LUCIUS L. CULVER, OF ST. LOUIS, MISSOURI.

WATER-HEATER.

SPECIFICATION forming part of Letters Patent No. 470,989, dated March 15, 1892.

Application filed February 7, 1890. Serial No. 339,520. (No model.)

*To all whom it may concern:*

Be it known that I, LUCIUS L. CULVER, of the city of St. Louis, in the State of Missouri, have invented a certain new and useful Improvement in Water-Heaters, of which the following is a full, clear, and exact description, reference being had to the accompanying drawings, forming part of this specification.

This is a device for the heating of water and air to supply the heat radiators and "registers" of a building. It is sectional in construction, so that its size and capacity may be increased by the addition of sections. The furnace has a downdraft.

The features of novelty are set forth in the claims.

Figure I is a longitudinal vertical section at I I, Fig. II, except that the hollow lining of the combustion-chamber is in section at I$^a$ I$^a$, Fig. XI. Fig. II is a compound horizontal section at II II, Fig. I. Fig. III is a transverse vertical section at III III, Fig. I. Fig. IV is a transverse vertical section at IV IV, Fig. I. Fig. V is a front elevation of the heater. Fig. VI is an enlarged detail view showing part of the top casting of the coal-magazine, and Fig. VII is a similar view of part of the bottom casting of the magazine. Fig. VIII is an enlarged detail vertical section of the magazine at VIII VIII, Fig. IX. Fig. IX is a top view of the heater. Fig. X is a detail elevation of the governor. Fig. XI is a perspective view of one of the hollow walls of the combustion-chamber, and Fig. XI$^a$ is a similar view showing a modification of the same. Fig. XII is a perspective view of one of the water-heating sections. Fig. XIII is an enlarged perspective view of one of the manifold pipes. Fig. XIV is a perspective view of one of the hollow plates forming the back of the fire-chamber. Fig. XV is an enlarged vertical section at XV XV, Fig. III. Fig. XVI is an enlarged vertical section at XVI XVI, Fig. III. Fig. XVII is an enlarged horizontal section at XVII XVII, Fig. III. Fig. XVIII is a perspective view of a hollow grate-bar section. Figs. XIX and XX are perspective views of the hollow bridge-wall sections, and Fig. XXI is a detail horizontal section showing the joint between these sections. Fig. XXII is a detail vertical section showing the joint connecting the hollow grate-bar sections and the hollow plates of the fire-chamber back.

1 is an outer case having a door 2 to the fire-chamber 3 and a door 4 closing the mouth 5 of the combustion-chamber. These doors have mica sheets 6 to allow sight of the interior. The case 1 may be of sheet metal, as shown, or of any other suitable material and may have any suitable form to inclose the case 7, between which and the case 1 is an air-space 8, open at the bottom for the admission of air and discharging at top through vents 9, which may connect with pipes leading to registers or other vents at a distance.

The coal or other fuel is fed to the fire through the means of a magazine 10, open at bottom to the fire-chamber 3 and extending up through the tops of the cases 7 and 1.

11 is a neck surrounding the magazine and tightly riveted to the top plates of the case 7. The magazine has two walls 12 and 13, between which is an air-space 14, extending all around the magazine and from top to bottom. The air-space 14 is open at bottom to the fire-chamber 3 and has at top openings 15, closed by doors 16, which constitute dampers by which the entrance of air is regulated. The top of the magazine is closed by a door 17. I prefer to construct the magazine with a top annular casting 18 and a bottom annular casting 19, to which the walls 12 and 13 are riveted. The openings 15 are made in the top casting 18 and the bottom openings 20 made in the casting 19.

21 are orifices made through the upper part of the wall 12 to allow the escape of fumes from the interior of the magazine into the annular air-space 14, down which the fumes will be carried with the descending air into the fire-chamber. (See Figs. I, III, and IX.)

22 are fire-clay or other tiles or plates lining the fire-chamber at the sides. These tiles are connected together by grooves at the edges and keys 23 inserted therein. (See Fig. II.)

The grate consists of a number of hollow sections 24, each of which has two or more hollow bars 25, whose interior passages connect with water-chambers 26 27 at each end of the section. The chambers 26 receive the cool water through branch pipes 28, leading from a manifold pipe 29.

30 are pipes which supply the cool water to the manifold 29.

31 is a pipe leading from each chamber 27 to a manifold pipe 32, having branches 33, connected with the chambers 35 at the lower ends of a number of water-heating sections 34 within a chamber 36, through which chamber the products of combustion ascend and from which they escape through the chimney-flue 37. (See Figs. I, II, IV, IX, and XIII.) These water-heating sections 34 are similar in construction and arrangement to those described and claimed in my application for patent, filed on or about November 16, 1889, under Serial No. 330,633. Each of these sections consists of a number of hollow bars $34^a$, connected at suitable intervals by cross-bars $34^b$ and having their ends connected to the chambers or manifolds 35, the whole being preferably formed integral, as shown in Fig. XII.

On the upper side of the chamber 35 at one end and on the lower side of the chamber 35 at the other end of each section 34 is formed a boss $34^c$, provided with a notch or groove, as shown. The boss of the upper section rests upon the boss of the section immediately below, and a key $34^d$ passes through the grooves in the two bosses, and thus secures the sections together. The sections communicate with each other alternately at opposite ends through short pipes or necks $34^e$. There is a vertical series of these heating-sections for each of the grate-sections 24, this construction allowing more or less of the combined grate and heating sections to be used side by side, according to the required capacity of the heater. In the drawings three of these compound sections are shown side by side, (see Figs. II, III, and IV,) while one, two, or a larger number may be used, according to the requirements of the case. The upper one of the heating-sections discharges the hot water into an upright pipe 38, by which it is conveyed to a manifold pipe 39, and from the manifold conveyed by pipes 40 to heat-radiators at a distance, from which radiators the water returns through the pipes 30 to the heater, as aforesaid.

The wall between the fire-chamber 3 and the chamber 36 is composed of hollow plates 41, having peripheral grooves 42 to receive keys 43, by which they are connected together. The keys are preferably made tight in the grooves 42 by asbestus cement or other cement that will withstand the heat. The vertical joints 42 43 between the plates 41 are preferably in the same planes as the meeting edges of the grate-sections 24, so that each grate-section has its part of the back wall attached to it and constituting part of the compound section, of which one or more may be used, according to the required capacity of the heater, as hereinbefore set forth. The lower one of the hollow plates 41 is connected with its grate-section 24 beneath by a screw-nipple 44, which forms a water communication between the chamber 27 of the grate-section and the chamber 45 of the plate. A similar nipple 44 forms connection between the chambers of the lower and upper plates 41. From the top of each upper plate 41 extends a pipe 46, up which the hot water flows into the manifold 39, where it mingles with the water heated in the sections 34. (See Figs. I, III, IX, and X.) Upon the rear side of each of the lower plates 41 is a projection 47, which is made hollow, the chamber within the projection communicating with the chamber 45. These projections 47 are for the support of the front ends of the sections 34. (See Figs. I and XIV.) The purpose of making the projection 47 hollow is to prevent the injury by heat.

48 are lugs, which are cast upon the outer edges of the outer hollow plates 41 to receive a bolt 49, by which the plates are attached to the side walls of the inner case 7. (See Figs. III and XIV.) The edges of the plates are fitted to the case 7 with a close joint.

50 is the combustion-chamber, which is below the fire-chamber 3, the hollow grate-bars 25 being between the chambers. The combustion-chamber is separated from the chamber 36 by the bridge-wall, which consists of one or more hollow casting or castings 51, two of such castings being shown fitted together by peripheral grooves 52 and key 53, composed of a metal strip, which is preferably set in the grooves with cement. The bridge-wall extends from side wall to side wall of the case 7, and is attached to the side walls by pipe-sections 54 55 and nuts thereon. The pipe-sections are screwed into screw-threaded holes 56, made in the corners of the bridge-wall. The holes 56 communicate with the interior chamber 57 of the castings.

58 are apertures made through the bridge-wall castings for the passage of the products of combustion from the combustion-chamber 50 into the chamber 36. The top of the bridge-wall is in contact with the grate-sections 24, and the bottom of the bridge-wall is in contact with the bottom $7^a$ of the case 7. (See Figs. I, II, III, IV, XX, and XXI.)

59 are pipes extending from the ends of the manifold pipe or hollow bar 29 and extending to the pipe-sections 54 at the lower corners of the bridge-wall, with which they are connected by elbows 60.

61 are union-couplings in the pipes 59. The pipe-sections 55 at the upper corners of the bridge-wall are connected by pipes 62 with the manifold pipe or hollow bar 32. (See Figs. II, III, and IV and dotted lines in Fig. I.)

Parts of the front and sides of the combustion-chamber are lined by angular hollow castings 63, through which the air passes into the combustion-chamber 50. The mouth 5 of the combustion-chamber extends between the front wings of the hollow linings or castings 63. Two of these hollow metal linings or castings are shown, one in Fig. XI and the other in Fig. XI$^a$. The former will be first described. 64 is the induction-opening, through which the air enters the chamber 65 of the casting. 65$^a$ are pipes connecting the induction-openings 64 with the outer air. 66 is a horizontal partition separating the chamber 65 into two compartments, which communicate only at 67. 68 are the eduction-openings through which the air escapes from the chamber 65 into the combustion-chamber 50. It will be seen that the air passes from the induction-opening 64 along the lower part of the front part of the chamber 65 and then backward along the side portion to the passage 67, up which it passes into the upper part of the chamber, and reverses its movement to the eduction-openings 68. In its passage the air attains a high temperature, so that when it mingles with the carbonaceous gases descending from the fire-chamber it causes a very thorough combustion. The positions of the openings or apertures 58 and 68 are such that these gases are intimately mingled in the chamber 50 to insure thorough combustion. The only difference between the casting shown in Figs. XI and XI$^a$ is that in the latter there are three of the horizontal partitions 66 66$^a$ 66$^b$, the opening 67 through the lower and upper partitions 66 and 66$^b$ being at the rear end, that of the second or middle partition 66$^a$ being at the front end, so that the air has to traverse the length of the casting four times before entering the combustion-chamber through the openings 68. 69 are dampers at the outer ends of the pipes 64$^a$, through which the air is supplied to the chambers 65. (See Figs. I, II, V, XI, and XI$^a$.)

The means for regulating the quantity of air entering the fire-chamber through the annular air-chamber 14, surrounding the magazine, will now be described. The doors 16 are hinged at 16$^a$ to the frame 18 and cover the orifices 15. I use to lift the doors 16 a device of which I do not claim to be the inventor, but which I will briefly describe. 70 is an enlargement of one of the ascending water-pipes 40, which contains a closed chamber containing water or other fluid that is heated by the water passing upward in the pipe 40. The closed chamber extends beneath a flexible metal or other diaphragm 71 in a case 72, the construction being such that the increased temperature of the water in pipe 40 is communicated to the contents of the chamber and raises the diaphragm. 73 is a beam, one end of which is connected to the extensions 16$^b$ of the doors and the other end of which carries a movable weight 74. 75 is a rod depending from the beam 73 and whose lower end bears upon the diaphragm 71. It will be seen that the upward movement of the diaphragm will cause the downward movement of the doors 16, so that an increase of heat in the water will cause a decrease in the amount of air supplied for combustion. The connection between the beam 73 and the doors 16 is shown consisting of two chains 76 with a stretcher 77 between them, by movement of which the length of the connection or distance between the beam and the doors may be readily adjusted. By shortening the connection 76 the heater will work at a higher temperature, as a greater amount of air will be supplied to the fire.

The device described under numbers 71 to 76, inclusive, forms a thermostat to regulate the amount of air passing into the fire-chamber 3 and thus to regulate the combustion.

In heaters of comparatively small capacity, where only one of the grate-sections 24 is used, the manifolds 29, 32, and 39 would be dispensed with, as they would not be required in the circuit of the liquid.

I claim as my invention—

1. The combination of the fuel-magazine 10, an air-supply chamber 14 surrounding it, a door 16, closing the entrance to the chamber 14, and a thermostat connected with the door 16, substantially as and for the purpose set forth.

2. The combination of grate-bar sections composed of two or more hollow bars 25, vertically-elongated and angular in cross-section, formed integral with manifold chambers 26 27, heating-sections 34 in the path of the products of combustion, inclined alternately in opposite directions, and communication for the liquid between the grate-sections and heating-sections, substantially as and for the purpose set forth.

3. The combination, in a liquid-heater, of the induction or return pipe 30, grate-section 24, with hollow bars 25, whose interiors are supplied with liquid by the return-pipe 30, sections 34, composed of hollow bars and end chambers and receiving liquid from the hollow grate-sections, pipe 38, carrying the liquid from the heater, and pipe 40, adapted to communicate with the pipe 30 through the medium of a radiator, substantially as and for the purpose set forth.

4. The combination, in a liquid-heater, of a hollow grate-section 24 and hollow fire-back plates 41, having communication with the chamber 27 of the grate-section and with each other and being provided with peripheral grooves and keys for securing them together, substantially as set forth.

5. The combination, in a liquid-heater, of the hollow grate-section 24, the hollow fire-back plate 41, communicating with said grate-section, the pipe 46, communicating with hollow plate 41, the pipe 29, connected to the grate-section, and the pipes 30 40, connected, respectively, with the pipes 29 46 and being adapted to connect with a radiator, so as to form a circuit through the heater, substantially as set forth.

6. The combination, in a liquid-heater, of the hollow fire-back section 41, hollow heater-section 34, and the hollow projection or bracket 47, adapted to support the end of the heating-section, substantially as set forth.

7. The combination, in a liquid-heater, of a fire-chamber, a combustion-chamber below the fire-chamber, and hollow lining-sections 63, receiving air at the lower part and discharging it at the upper part into the combustion-chamber, substantially as set forth.

8. The combination, in a liquid-heater, of a combustion-chamber 50, hollow lining-section 63, with induction-opening 64 and eduction-opening 68, damper 69, regulating the entrance of outer air to the induction-opening and the fire-grate below which said combustion chamber is located, so that the latter will receive the products of combustion by a downdraft, substantially as set forth.

9. In a water-heating apparatus, the combination of a fuel-magazine 10 with surrounding air-chamber 14, discharging into the fire-chamber at bottom, a door 16 at top closing the entrance to the chamber 14, and the thermostat-lever connected with the door 16 and actuated by the diaphragm 75, forming the top of the chamber communicating with the discharge-pipe of the water-heater, substantially as set forth.

10. The combination of the combustion-chamber 50, a hollow bridge-wall 51 at the rear of said chamber, having an opening 58 for the passage of the products of combustion, the hollow grate-section having communication with the lower part of said bridge-wall, and the water-sections 34, having communication with the upper part of said bridge-wall, substantially as set forth.

11. In a water-heater, the combination of a magazine 10, a fire-chamber beneath the magazine, hollow grate-bars, a combustion-chamber beneath the fire-chamber, a hollow bridge-wall having air-openings through which the products of combustion pass into the lower part of a chamber containing heating-sections 34, and water-pipes adapted to form with the hollow grate-bars and heating-sections a water-circuit, substantially as and for the purpose set forth.

12. In a water-heater, the magazine 10, fire-chamber 3, hollow grate-bars 25, hollow fire-back plates 41, combustion-chamber 50, hollow air-heating lining 63, hollow perforate bridge-wall 51, chamber 36, water-heaters 34, and pipes forming with the hollow grate-bars 25 and water-heaters 34 a water-circuit, all combined and constructed substantially as set forth.

13. In a water-heater, the magazine 10, with an annular air-passage around it discharging air into the fire-chamber, doors governing the entrance of air into the annular passage, a fire-grate, a combustion-chamber beneath the fire-grate, a hollow air-heating lining with chamber discharging into the combustion-chamber, and dampers regulating the entrance of air into the air-chamber of the heating-lining, substantially as and for the purpose set forth.

LUCIUS L. CULVER.

In presence of—
SAML. KNIGHT,
E. S. KNIGHT.